(12) United States Patent
Bush et al.

(10) Patent No.: US 7,096,661 B2
(45) Date of Patent: Aug. 29, 2006

(54) AXIAL DIVERGENT SECTION SLOT NOZZLE

(75) Inventors: Robert H. Bush, Glastonbury, CT (US); Sean Zamora, Coventry, CT (US); Harry Culver, Colchester, CT (US); Donald William Peters, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 183 days.

(21) Appl. No.: 10/811,374

(22) Filed: Mar. 26, 2004

(65) Prior Publication Data

US 2005/0210861 A1    Sep. 29, 2005

(51) Int. Cl.
*F02K 1/00* (2006.01)

(52) U.S. Cl. .................. 60/232; 60/770; 239/265.19

(58) Field of Classification Search .......... 239/265.19, 239/265.35, 265.39, 265.41, 265.33, 265.37; 60/230, 232, 228, 770
See application file for complete search history.

(56) References Cited

U.S. PATENT DOCUMENTS

| | | | |
|---|---|---|---|
| 3,044,258 A * | 7/1962 | Carlton et al. ........... 239/127.3 |
| 4,440,347 A | 4/1984 | Madden et al. |
| 4,878,618 A * | 11/1989 | Hufnagel ............... 239/265.39 |
| 5,039,014 A * | 8/1991 | Lippmeier ............. 239/265.39 |
| 5,232,158 A * | 8/1993 | Barcza .................. 239/265.35 |
| 5,238,189 A * | 8/1993 | Barcza .................. 239/265.39 |
| 5,261,605 A * | 11/1993 | McLafferty et al. ... 239/265.35 |
| 5,269,467 A * | 12/1993 | Williams et al. ....... 239/265.41 |
| 5,285,637 A * | 2/1994 | Barcza .................. 239/265.35 |
| 5,461,856 A * | 10/1995 | Mendia et al. ................ 60/230 |
| 5,484,105 A * | 1/1996 | Ausdenmoore et al. .. 239/127.3 |
| 5,513,799 A * | 5/1996 | Mendia et al. ......... 239/265.41 |
| 5,613,636 A * | 3/1997 | Zubillaga et al. ...... 239/265.35 |
| 5,667,140 A * | 9/1997 | Johnson et al. ........ 239/265.33 |
| 5,676,312 A * | 10/1997 | Lapergue et al. ...... 239/265.19 |
| 5,797,544 A | 8/1998 | Ward |
| 5,839,663 A * | 11/1998 | Broadway et al. ..... 239/265.35 |
| 6,148,608 A * | 11/2000 | Martin et al. ................. 60/232 |
| 6,745,570 B1 * | 6/2004 | Renggli et al. ............... 60/771 |

* cited by examiner

*Primary Examiner*—William H. Rodriguez
(74) *Attorney, Agent, or Firm*—Bachman & LaPointe, P.C.

(57) ABSTRACT

An axial divergent section slot nozzle for an engine is provided. The nozzle has a plurality of spaced apart divergent flaps, at least one device for moving the divergent flaps to change a cross sectional area of the nozzle in a throat region, and a bridge member positioned intermediate adjacent ones of the flaps. The bridge member includes a bridge bracket and a sealing element joined to the bridge bracket. The sealing element has an upper surface. The bridge bracket has a lower surface which diverges from the upper surface of the sealing element. In a preferred embodiment of the present invention, the bridge bracket has a shape which allows variable slot size depending on nozzle throat jet area.

21 Claims, 4 Drawing Sheets

AXIAL DIVERGENT SECTION SLOT NOZZLE

BACKGROUND OF THE INVENTION (1) Field of the Invention

The present invention relates to an axial divergent section slot nozzle for use with a jet engine which allows a flow of ambient air by which an exhaust plume and thrust from the nozzle may be tailored.

(2) Prior Art

There are many convergent/divergent (C/D) exhaust nozzles for gas turbine engines that are disclosed in the literature and that are utilized on jet and turbojet engines for changing the throat configuration of the nozzle in order to improve engine performance during certain modes of operation. This is particularly the case in aircraft that are powered by gas turbine engines with augmentors. The exhaust nozzle may be configured in a two or three dimensional configuration with or without the capability of vectoring the exhaust gases. The purpose of the vectoring nozzle is to effectuate directional change of or reversing thrust to brake the aircraft.

For many years now, engineers and scientists have worked to design and produce gas turbine engines that are capable of short take-off and vertical landing (STOVL) operation. Also well known is that the exhaust nozzle may include positional flaps that are articulated to provide vectoring capabilities. Alternatively, the entire engine exhaust nozzle may be articulated by rotatable interconnecting ducts similar to what has been used in the Russian YAK-141 aircraft, manufactured by Yakovlevin Aircraft, in order to produce vectoring capabilities.

U.S. Pat. No. 5,797,544 to Ward illustrates a compact axisymmetrical C/D exhaust nozzle which may be utilized on a gas turbine engine for a short take-off and vertical landing aircraft and mechanisms for synchronizing the flaps and guiding the combined pressure balancing piston and synchronizing ring.

U.S. Pat. No. 4,440,347 to Madden et al. illustrates a variable area nozzle having the upstream ends of the flaps pivotally connected to an axially translatable unison ring. Apparatus is associated with the flaps to cause the flaps to rotate as the unison ring is translated to vary the area of the nozzle. The unison ring includes a balance surface fixed relative thereto which is subject to a net pressure load in the downstream direction thereby reducing the force which an actuator must exert to move the unison ring or to hold the unison ring in fixed position.

U.S. Pat. No. 5,285,637 to Barcza relates to a seal centering and restraining device for positioning the seals between the divergent flaps of a vectoring C/D nozzle. The device includes a restraint bar that spans between two adjacent divergent flaps and is pivotally attached to the air side of a seal and slidably secured by sliders to tracks on the adjacent divergent flaps, thereby sandwiching the adjacent divergent flaps between the seal and sliders. A positioning linkage connecting the two adjacent divergent flaps centers the seal at all nozzle operating conditions.

Despite the existence of these convergent/divergent nozzles, there remains a need for nozzle designs which improve performance.

SUMMARY OF THE INVENTION

It is an object of the present invention to provide a method for tailoring the exhaust plume of a convergent/divergent nozzle to reduce hot gas ingestion into a plane inlet.

It is a further object of the present invention to provide a method to increase the thrust of a nozzle operating in an over-expanded condition.

It is a further object of the present invention to provide one instance of a new bridge member design for use in an engine having a convergent/divergent nozzle.

The foregoing objects are attained by the present invention.

In accordance with the present invention, an axial divergent section slot nozzle for an engine is provided. The nozzle broadly comprises a plurality of spaced apart flaps, a plurality of seals which fill the gaps between adjacent flaps, means for moving the flaps to change a cross sectional area of the nozzle, and a bridge member to position the seals between intermediate adjacent flaps. The bridge member includes a bridge bracket and a sealing element joined to the bridge bracket. The sealing element has an upper surface and the bridge bracket has a lower surface which diverges from the upper surface of the seal member. In a preferred embodiment of the present invention, the bridge bracket has a shape, such as a diamond shaped wedge, which allows variable slot sizing depending on nozzle throat jet area.

Also in accordance with the present invention, a method for tailoring an exhaust plume of an engine is provided. The method comprises the steps of providing an engine with a nozzle having movable flaps and movable bridge members, which include sealing elements, which create a divergent zone in the nozzle, operating the engine so as to create an overexpanded condition in the divergent zone, and positioning the flaps and bridge members so as to tailor an exhaust plume from the nozzle. In a preferred embodiment, the exhaust plume is tailored so that the flow is evenly distributed circumferentially.

Also in accordance with the present invention, a method for increasing thrust is provided. The method comprises the steps of opening axial slots or gaps when an axial divergent section slot nozzle is operating in an overexpanded condition and thereby creating a favorable pressure gradient which entrains ambient air so as to produce thrust and prohibit the core flow from expanding beyond ideal.

Other details of the axial divergent section slot nozzle of the present invention, as well as other advantages and objects attendant thereto, are set forth in the following detailed description and the accompanying drawings wherein like reference numerals depict like elements.

DETAILED DESCRIPTION OF THE PREFERRED EMBODIMENT(S)

Figure 1:
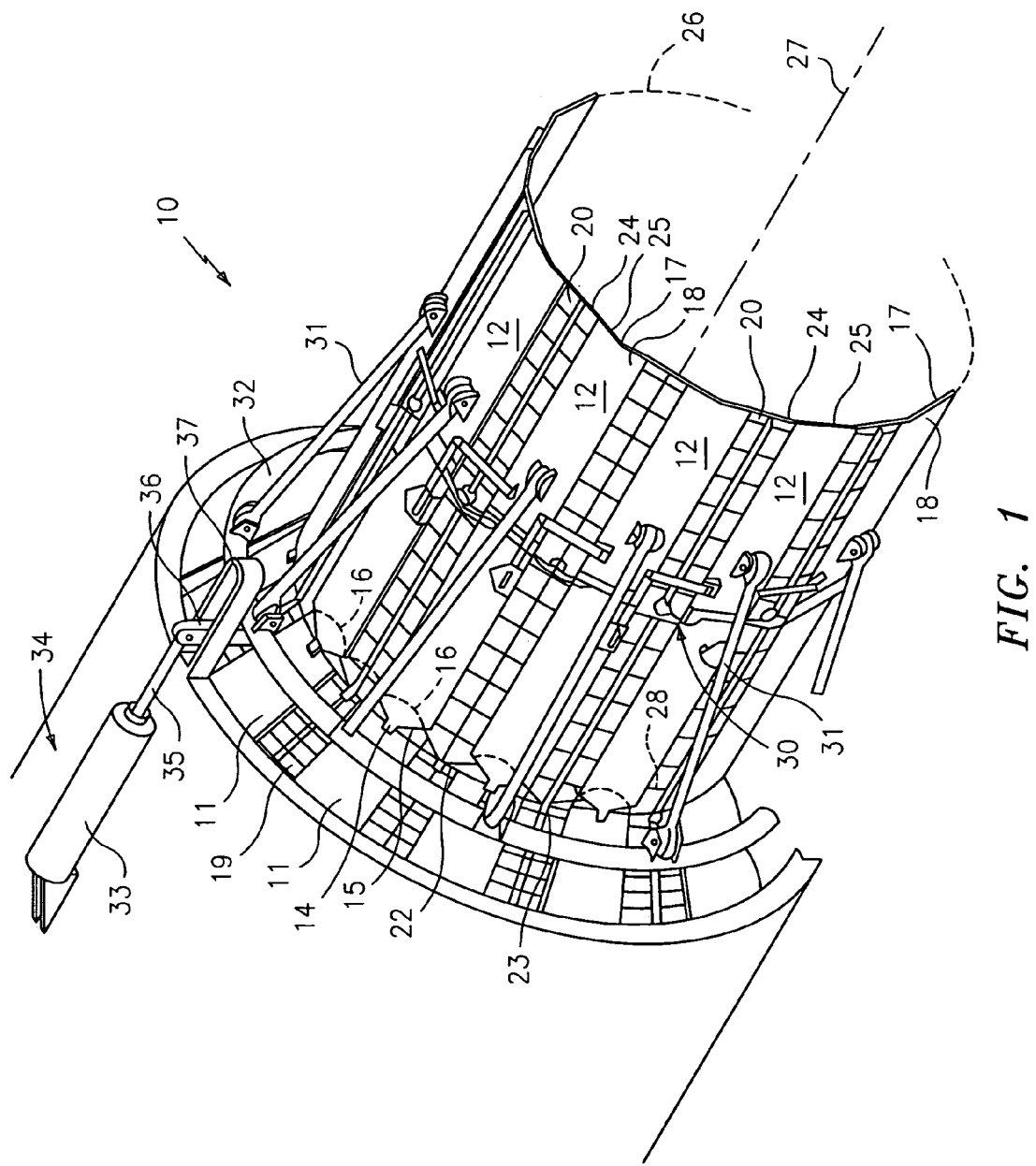
FIG. 1 is a partial isometric view of a convergent/divergent nozzle incorporating the bridge bracket of the present invention.

FIG. 1 shows a convergent/divergent nozzle 10 incorporating convergent flaps 11 with elongated divergent flaps 12 pivotally attached to the trailing edge 13 thereof by a divergent flap hinge 14 at the leading edge 15 of the divergent flap 12. The convergent/divergent flap assembly includes a flap hinge seal 16 which overlays the hinge 14 to prevent the escape of exhaust gas from the gas turbine engine at the hinge 14. Each of the divergent flaps 12 has a gas side 17 and an air side 18. As used herein, the term "gas side" refers to the surface of the respective component that is exposed to the exhaust gas of the engine and the term "air side" refers to the surface of the component opposite the gas side.

A convergent seal 19 is located between each pair of convergent flaps 11. A bridge member 20, having a sealing element 204, is positioned between each pair of adjacent divergent flaps 12. The leading edge of each sealing element 204 may be pivotally connected to a trailing edge 22 of a respective convergent seal 19 immediately upstream therefrom by a seal hinge 23. A seal 28 overlays the seal hinge 23 to prevent the escape of exhaust gas at the seal hinge 23.

The trailing edges of the sealing element 204 and the trailing edges 25 of the divergent flaps 12 define the perimeter 26 of the exhaust area of the nozzle 10.

The throat area of the nozzle 10 may be controlled by the convergent flaps 11 through the "balanced beam" arrangement known in the art and disclosed in U.S. Pat. No. 5,082,182, which is incorporated by reference herein. The exhaust area may be controlled as follows.

Each of the divergent flaps 12 may be pivotally connected to a sync-ring linkage 31, which is in turn pivotally connected to a sync-ring 32. Three actuators 33 are mounted to the engine case 34 at 120 degree intervals. The arm 35 of each actuator 33 is pivotally connected to a sync-ring bracket 36 which may be slidably received within a guide 37 fixedly secured to the engine case 34. From the foregoing description, those skilled in the art will readily appreciate that if the actuators 33 act symmetrically on the sync-ring 32, the sync-ring 32 translates along the axis of the nozzle 10, thereby increasing or decreasing the exhaust area of the nozzle 10.

Figure 2:
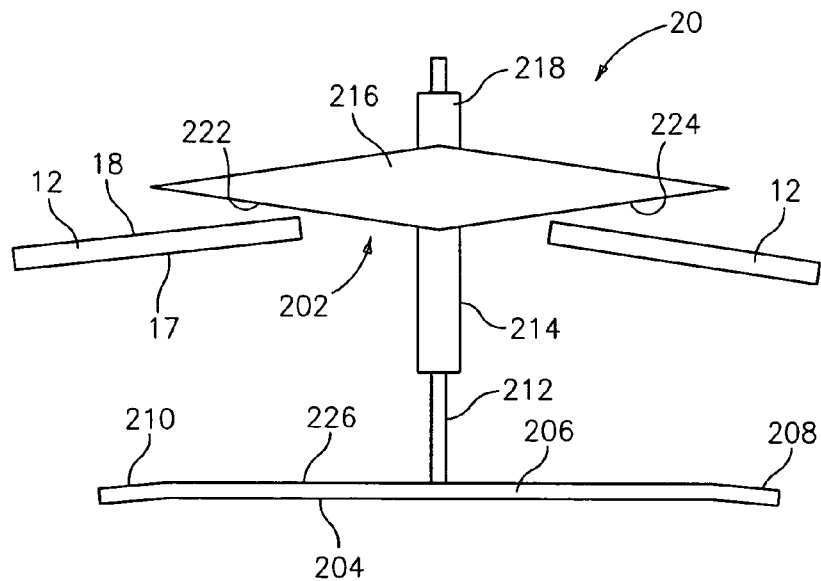
FIG. 2 is a side view of a bridge member in accordance with the present invention.

Referring now to FIG. 2, each bridge member 20 with its sealing element 204 spans a space 202 between two adjacent divergent flaps 12. Each sealing element 204 has a central portion 206 and angled end portions 208. When the engine is operating in a non-overexpanded state, the upper surface 210 of the end portions 208 contacts the gas side 17 of the adjacent divergent flaps 12. The sealing element 204 prevents flow of the exhaust gases through the space 202 because the pressure in the nozzle 10 is greater than ambient air pressure.

Each bridge member 20 also has a backbone support 212 at the mid-span of the central portion 206. The backbone support 212 includes a restraint mounting post 214 to which is attached a bridge bracket 216. The bridge bracket 216 fits over a portion of the post 214 and is held in place by a nut 218 which is internally threaded (not shown). The internal threads of the nut 218 engage mating threads (not shown) on the post 214 and thus hold the bridge bracket 216 onto the post 214. In a preferred embodiment, the bridge bracket 216 is capable of rotation relative to the post 214.

As can be seen from FIG. 2, the bridge bracket 216 overlaps the air side 18 of the divergent flaps 12. The bridge bracket 216 has a shape, such as a diamond shaped wedge, which allows variable slot size depending on the nozzle throat jet area. Preferably, the bridge bracket 216 has lower surfaces 222 and 224 which are at an angle to the upper surface 226 of the central portion 208 of the sealing element 204 so that the surfaces 222 and 224 diverge away from the upper surface 226.

The nozzle 10 may be operated in an overexpanded condition during STOVL operation of the engine. In such a state, the divergent flaps 12 are spaced from each other and form a plurality of spaces or gaps 202. Depending on the particular nozzle throat jet area condition, the spaces 202 may be smaller or larger. The flaps 12 and the spaces 202 form a cross sectional area expansion for the nozzle 10 to the trailing edge of the flaps 12.

The overexpanded condition may be imposed by the operating conditions of the nozzle (the nozzle pressure ratio (NPR)). There is a single ideal expansion condition where the ambient air pressure is equal to the pressure that exists when the flow expands ideally to the exit. Below this NPR, the nozzle is overexpanded and a favorable pressure gradient is formed. The present invention takes advantage of the characteristics of an overexpanded nozzle to bring flow into the divergent section, reducing the effective area ratio to closer to ideal. This changes the exhaust plume characteristics and increases thrust at the condition of interest over that which would occur without the present invention. The flow will not expand beyond ideal using the present invention, because as ambient air is introduced, the pressure increases and the driving pressure gradient goes to zero.

Figure 3:
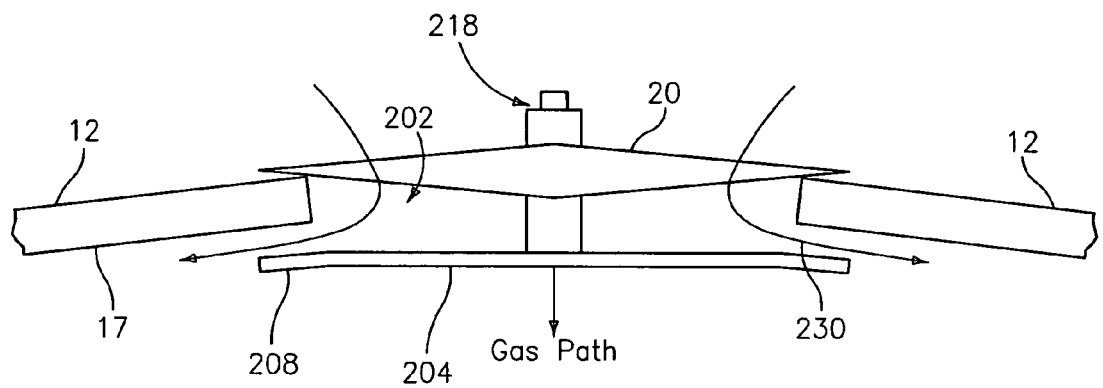
FIG. 3 is a side view of a bridge member in a first jet area setting.

Referring now to FIG. 3, there is shown a first jet area condition in the throat of the nozzle 10. In an overexpanded condition, the pressure within the nozzle 10 is less than ambient pressure. A pressure differential or gradient is created which opens the spaces 202 between the flaps 12 and the sealing elements 204. This allows ambient air to flow through each space 202 and through each slot 230 formed between the gas side 17 of the divergent flaps 12 and the end portions 208 of each sealing element 204. As can be seen from FIG. 3, the space 202 between adjacent flaps can be quite large and the slots 230 can be large.

Figure 4:
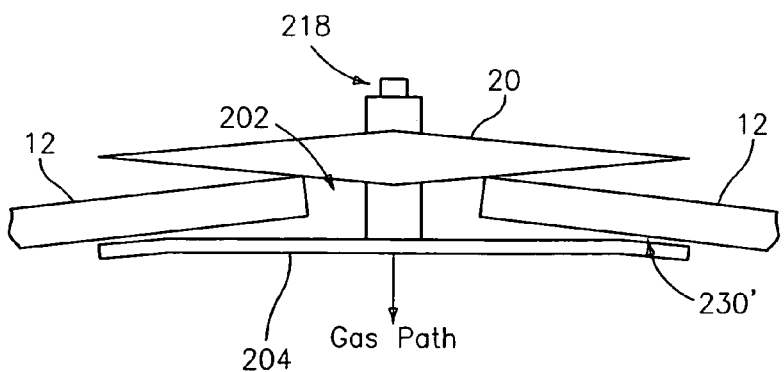
FIG. 4 is a side view of a bridge member in a second jet area setting.

Referring now to FIG. 4, there is shown a second jet area condition in the throat of the nozzle 10 where the space 202 is smaller than the space 202 in FIG. 3. In this state, very little ambient air is still capable of flowing through the space 202 and through the smaller gaps 230'.

By using the bridge members 20 of the present invention, when the nozzle 10 is in an overexpanded condition, tailoring of the exhaust plume can be effected when the spaces or gaps 202 between the divergent flaps 12 occupy from 3.0% to 30% of the nozzle surface area at the throat of the nozzle 10. The bridge members 20 of the present invention have been found to be particularly useful when the spaces 202 between the divergent flaps 12 occupy from 8.0% to 12.0% of the nozzle throat surface area.

As discussed, flowing ambient air into the nozzle 10 in this fashion during operation of the engine in an overexpanded condition advantageously allows plume tailoring and increases thrust. Using the bridge members of the present invention also advantageously reduces loads on hardware and saves weight. Still another advantage of the present invention is that the exhaust plume can be tailored to reduce hot gas ingestion into the aircraft inlet.

Figure 5B:
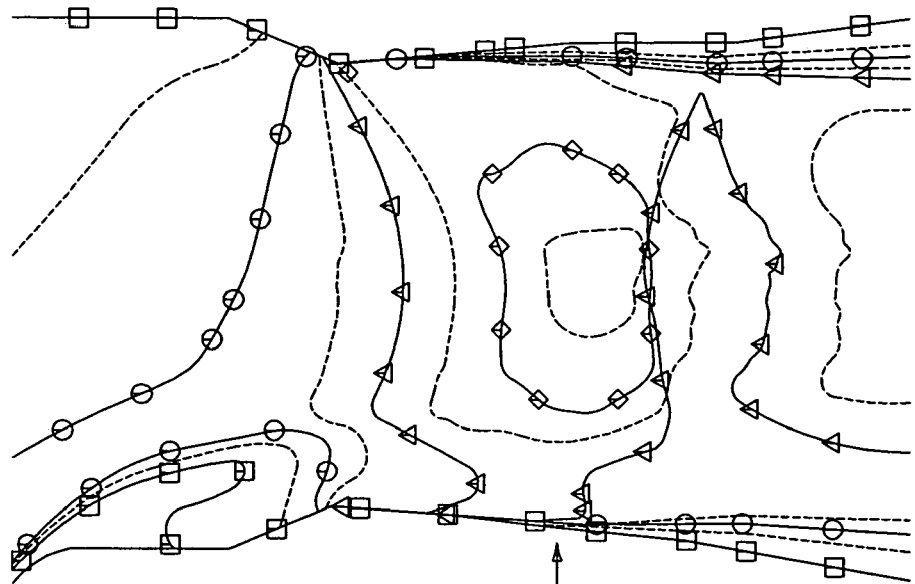
FIG. 5B shows the Mach contours for a STOVL nozzle in hover at NPR=2,365 for a nozzle with 10% porosity gaps in the divergent section.
Figure 5A:
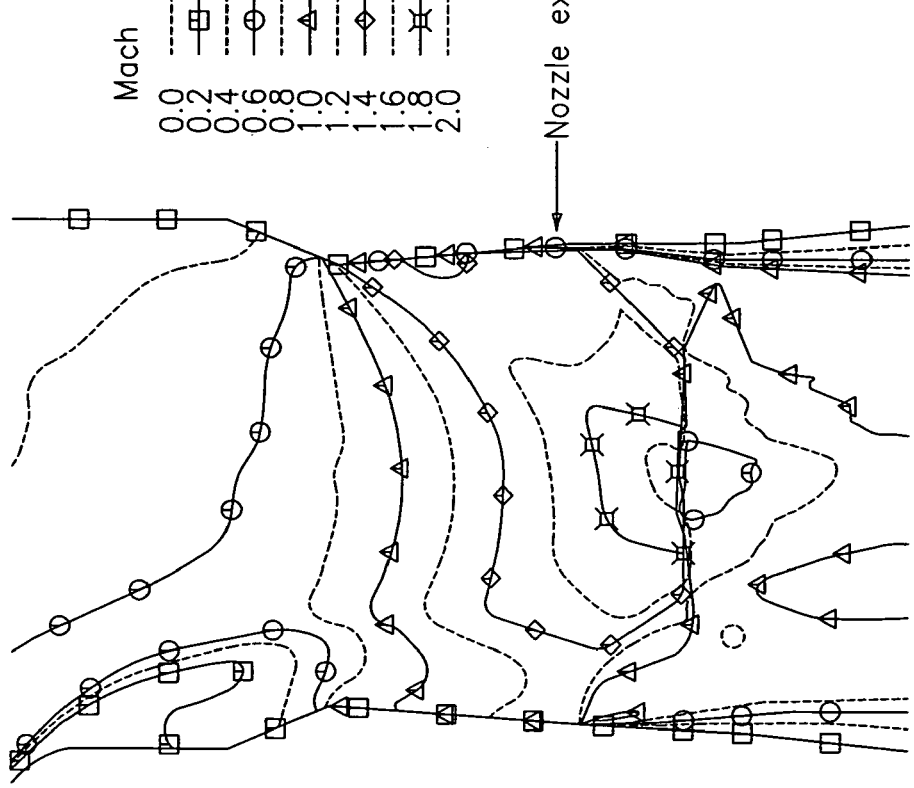
FIG. 5A shows the Mach contours for a STOVL nozzle in hover at NPR=2.365 for a nozzle without gaps in the divergent section.

FIGS. 5A and 5B show the benefits which can be obtained by using the bridge members of the present invention. FIG. 5A shows the Mach contours for a STOVL nozzle in hover at a nozzle pressure ratio (NPR) which equals 2.365 for a nozzle without gaps in the divergent section. This figure shows a strong shock outside the nozzle exit. FIG. 5B shows the Mach contours for a STOVL nozzle utilizing the bridge members of the present invention in hover for the same NPR with the nozzle having gaps 202 in the divergent section which occupy 10% of the surface area at the throat. This figure shows a weak shock outside the nozzle exit.

Figure 6B:
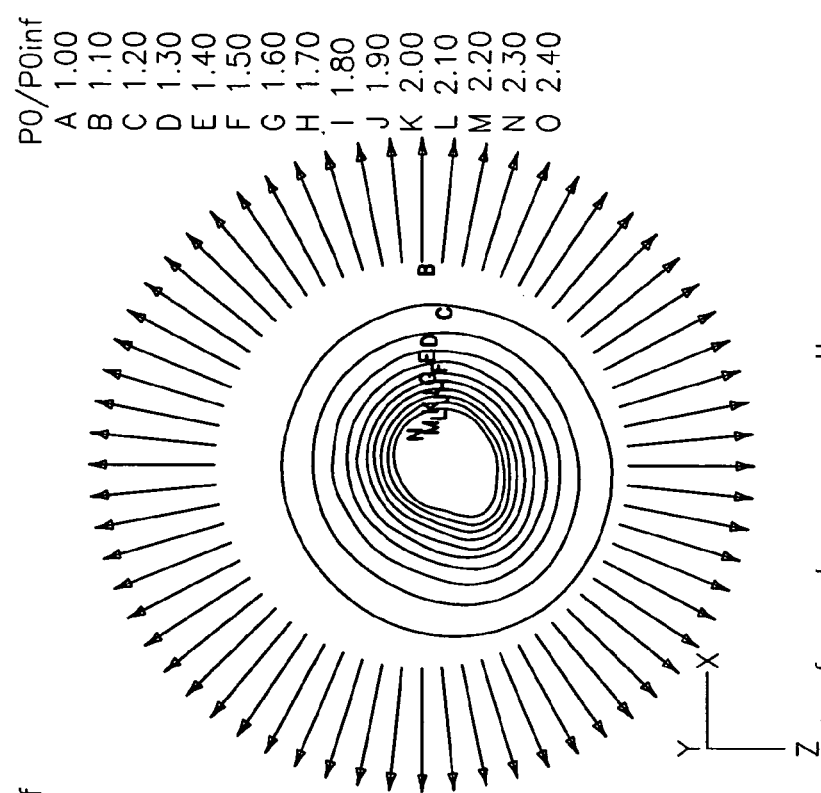
FIG. 6B shows the total pressure contours and momentum vectors in an exhaust plume near the ground for the nozzle of FIG. 5B.
Figure 6A:
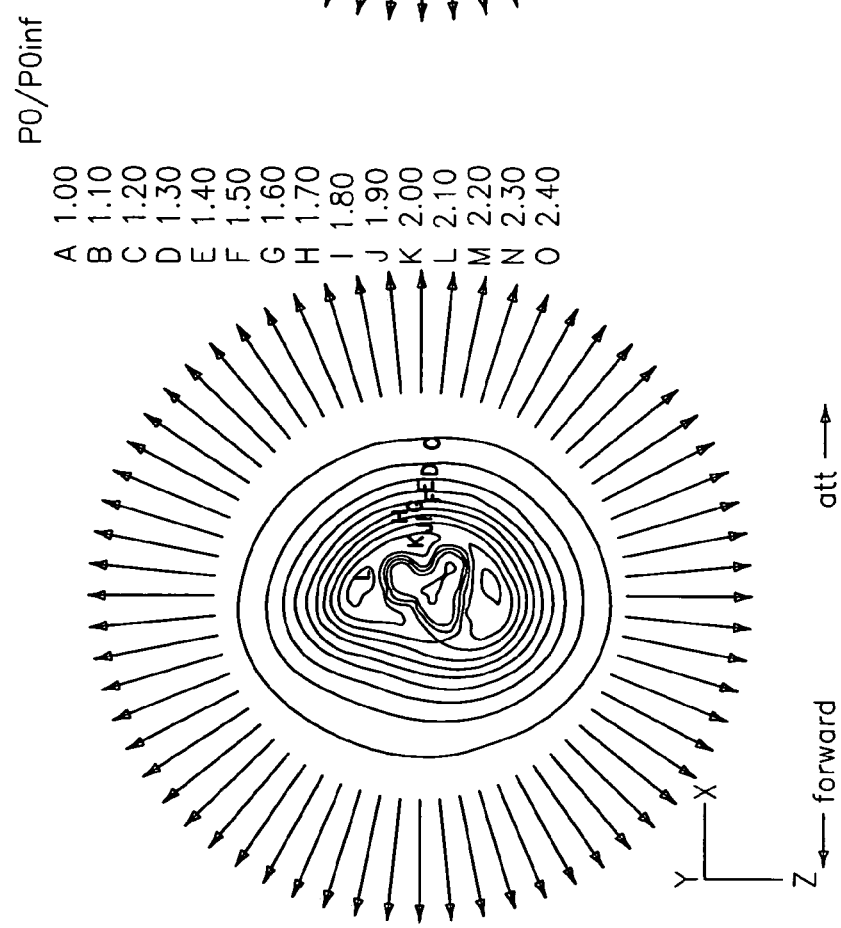
FIG. 6A shows the total pressure contours and momentum vectors in an exhaust plume near the ground for the nozzle of FIG. 5A.

FIGS. 6A and 6B show the total pressure contours and momentum vectors in the exhaust plume near the ground. As can be seen from FIG. 6A, the nozzle with no gaps in the divergent section show a flow biased forward toward the aircraft inlets. While FIG. 6B shows that the nozzle with 10% porosity using the bridge members of the present invention has an exhaust plume with the flow evenly distributed circumferentially.

The foregoing advantages are attained because the presence of the gaps 202 and the slots 230 or 230' weaken the overexpansion and thus change the plume shape.

It should be noted that a nozzle using the bridge members of the present invention can be used with engines used on military aircraft, supersonic business jets, and pulse detonation engines.

It is apparent that there has been provided in accordance with the present invention an axial divergent section slot nozzle which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An axial divergent section slot nozzle for an engine comprising:
    a plurality of spaced apart divergent flaps;
    means for moving said divergent flaps;
    a bridge member positioned intermediate adjacent ones of said divergent flaps;
    each said bridge member including a bridge bracket and a sealing element joined to said bridge bracket;
    said sealing element having an upper surface; and
    said bridge bracket having a lower surface which has a center point and end tips and which lower surface has a first portion extending from said center portion to a first one of said end tips which diverges from said upper surface of said sealing element and a second portion extending from said center point to a second one of said end tips which diverges from said upper surface of said sealing element.

2. An axial divergent section slot nozzle according to claim 1, wherein said divergent flaps move relative to said lower surface so that in an overexpanded condition of said nozzle having a first nozzle throat area, a first slot is created between said upper surface of said sealing member and lower surfaces of said flaps.

3. An axial divergent section slot nozzle according to claim 2, wherein said divergent flaps move relative to said lower surfaces so that in an overexpanded condition of said nozzle having a second nozzle throat area smaller than said first nozzle throat area, a second slot smaller than said first slot is created between said upper surface of said seal member and said lower surfaces of said flaps.

4. An axial divergent section slot nozzle according to claim 1, further comprising means for joining said sealing element to said bridge bracket.

5. An axial divergent section slot nozzle according to claim 1, wherein said bridge bracket is shaped to allow variable slot size depending on nozzle throat jet area.

6. An axial divergent section slot nozzle according to claim 1, further comprising a plurality of said divergent flaps defining a nozzle surface area and said flaps being spaced apart by gaps which comprise from 3.0% to 30% of said nozzle throat surface area.

7. An axial divergent section slot nozzle according to claim 6, wherein said divergent flaps are spaced apart by gaps which comprise from 8.0% to 12.0% of said nozzle throat surface area.

8. An ejector nozzle bridge member comprising:
    a bridge bracket:
    a sealing element joined to said bridge bracket;
    said sealing element having an upper surface; and
    said bridge bracket having a lower surface which has a center point and end tips and which lower surface has a first portion extending from said center portion to a first one of said end tips which first portion diverges from said upper surface of said sealing element and a second portion extending from said center point to a second one of said end tips which second portion diverges from said upper surface of said sealing element, said first portion being joined to said second portion at said center point.

9. An ejector nozzle bridge member according to claim 8, further comprising said sealing element having a central portion and end portions at an angle to said central portion.

10. An ejector nozzle bridge member according to claim 8, further comprising:
    a backbone support attached to said sealing element;
    said bridge bracket fitting over said backbone support; and
    means for securing said bridge bracket on said backbone support.

11. An ejector nozzle bridge member according to claim 8, wherein said bridge bracket has a shape which allows variable slot size depending on nozzle throat jet area.

12. A method for tailoring an exhaust plume of an engine, said method comprising the steps of:
    providing an engine with a nozzle having movable flaps which create a divergent zone;
    providing a bridge member between adjacent ones of said flaps;
    operating said engine and said flaps so as to create an overexpanded condition within said nozzle;
    positioning said flaps so as to tailor an exhaust plume from said nozzle to have a flow evenly distributed circumferentially; and
    said bridge member providing step comprising providing a bridge member having a sealing element and a bridge bracket having lower surfaces which diverge away from an upper surface of said sealing element.

13. A method according to claim 12, wherein said flap positioning step comprises moving adjacent ones of said flaps relative to said bridge member so as to create slots which allow ambient air to flow into said exhaust nozzle.

14. A method according to claim 12, wherein said flap positioning step comprises positioning said flaps so that gaps are created between adjacent ones of said flaps which occupy from 3.0% to 30% of a surface area of said nozzle.

15. A method according to claim 12, wherein said flap positioning step comprises positioning said flaps so that gaps are created between adjacent ones of said f laps which occupy from 8/0% to 12% of a surface area of said nozzle.

16. A method according to claim 12, wherein said bridge member providing step further comprises providing a bridge bracket having a diamond wedge shape.

17. A method for tailoring an exhaust plume of an engine, said method comprising the steps of:
 providing an engine with a nozzle having movable flaps which create a divergent zone;
 providing a bridge member between adjacent ones of said flaps;
 operating said engine and said flaps so as to create an overexpanded condition within said nozzle;
 positioning said flaps so as to tailor an exhaust plume from said nozzle to have a flow evenly distributed circumferentially; and
 said engine operating step comprising creating said overexpanded condition while said engine and said nozzle is operating in a STOVL condition.

18. A method for increasing the thrust produced by an axial divergent section slot nozzle comprising the steps of:
 providing a nozzle having a plurality of spaced apart divergent flaps;
 providing a plurality of bridge members having sealing elements which close a plurality of gaps between said divergent flaps, said bridge members providing step comprising providing a plurality of bridge members each having lower surfaces which diverge away from an upper surface of one of said sealing elements; and
 opening said gaps by operating said nozzle in an overexpanded condition and thereby creating a pressure gradient which allows ambient air surrounding said nozzle to flow into said nozzle.

19. A method according to claim 18, wherein said bridge member providing step further comprises providing a plurality of bridge members each having a sealing element which contacts a gas side of a pair of said flaps and a bridge bracket positioned on an air side of said flaps joined to said sealing element.

20. A method according to claim 19, wherein said bridge providing step further comprises providing a bridge bracket shaped to allow variable slot size depending on nozzle throat jet area.

21. A method according to claim 18, wherein said opening step comprises creating a pressure differential which causes each said sealing element to lose contact with said adjacent ones of said divergent flaps.

* * * * *

UNITED STATES PATENT AND TRADEMARK OFFICE
CERTIFICATE OF CORRECTION

PATENT NO. : 7,096,661 B2 Page 1 of 1
APPLICATION NO. : 10/811374
DATED : August 29, 2006
INVENTOR(S) : Robert H. Bush et al.

It is certified that error appears in the above-identified patent and that said Letters Patent is hereby corrected as shown below:

In column 7, claim 15, line 1, "f laps" should read --flaps--.

In column 7, claim 15, line 2, "8/0%" should read --8.0%--.

Signed and Sealed this

Thirteenth Day of May, 2008

JON W. DUDAS
*Director of the United States Patent and Trademark Office*